(12) United States Patent
Markiton et al.

(10) Patent No.: US 8,019,506 B2
(45) Date of Patent: Sep. 13, 2011

(54) METHOD OF CALIBRATING AND STEERING A VEHICLE PROVIDED WITH A POSITIONING SYSTEM

(75) Inventors: Wojciech Markiton, Soenderborg (DK); Soeren Moeller Hansen, Soenderborg (DK)

(73) Assignee: Sauer-Danfoss ApS, Nordborg (DK)

( * ) Notice: Subject to any disclaimer, the term of this patent is extended or adjusted under 35 U.S.C. 154(b) by 713 days.

(21) Appl. No.: 12/063,921

(22) PCT Filed: Aug. 17, 2006

(86) PCT No.: PCT/DK2006/000452
§ 371 (c)(1),
(2), (4) Date: Jun. 30, 2008

(87) PCT Pub. No.: WO2007/019864
PCT Pub. Date: Feb. 22, 2007

(65) Prior Publication Data
US 2009/0033053 A1    Feb. 5, 2009

(30) Foreign Application Priority Data

Aug. 18, 2005   (DK) .................................. 2005 01166

(51) Int. Cl.
*G05D 1/02* (2006.01)
*B62D 15/02* (2006.01)
*G08G 1/16* (2006.01)

(52) U.S. Cl. .......................... 701/41; 701/213; 280/93.5

(58) Field of Classification Search .................... 701/41, 701/213, 300, 301; 280/93.5; 180/204
See application file for complete search history.

(56) References Cited

U.S. PATENT DOCUMENTS

| 4,931,930 A | 6/1990 | Shyu et al. |
| 6,052,647 A | 4/2000 | Parkinson et al. |

(Continued)

FOREIGN PATENT DOCUMENTS

DE    38 13 083 A1    11/1989

(Continued)

OTHER PUBLICATIONS

Search Report for Serial No. PCT/DK2006/000452 dated Oct. 19, 2006.

(Continued)

*Primary Examiner* — Tan Q Nguyen
(74) *Attorney, Agent, or Firm* — McCormick, Paulding & Huber LLP

(57) ABSTRACT

The invention provides a method of calibrating a steering system for a vehicle, e.g. an off-highway machinery, to allow automatic steering based on input from a position or tracking system, e.g. based on a Global Positioning System (GPS). At least two records, each comprising a position value and a curvature value are established. The position value represents a position of the steered element, e.g. a position of a steered wheel of the vehicle, and the curvature value could e.g. be expressed as a radius of a curve followed by the vehicle with that position of the steered element. The curvature value is determined by the positioning system during movement of the vehicle. Due to the records, it is easy to calibrate or recalibrate the system and the invention is therefore applicable e.g. in connection with manufacturing of vehicles in small batch numbers, e.g. for one of a kind production or for retrofitting of steering components to existing vehicles. The invention further provides a method of operating the vehicle and a steering system incorporating the above mentioned calibration method.

10 Claims, 10 Drawing Sheets

U.S. PATENT DOCUMENTS

| | | | |
|---|---|---|---|
| 6,059,063 | A | 5/2000 | Shimizu et al. |
| 6,314,348 | B1 | 11/2001 | Winslow |
| 6,539,303 | B2 | 3/2003 | McClure et al. |
| 6,929,082 | B2 | 8/2005 | Kataoka et al. |
| 7,065,440 | B2 * | 6/2006 | Aral .................. 701/50 |
| 7,117,076 | B2 | 10/2006 | Shimakage et al. |
| 7,640,088 | B2 * | 12/2009 | Lange .................. 701/41 |
| 2002/0072850 | A1 | 6/2002 | McClure et al. |
| 2004/0124605 | A1 | 7/2004 | McClure et al. |
| 2004/0186644 | A1 | 9/2004 | McClure et al. |
| 2005/0043882 | A1 | 2/2005 | Takazawa |
| 2005/0057374 | A1 * | 3/2005 | Tanaka et al. .......... 340/932.2 |
| 2005/0165546 | A1 | 7/2005 | Aral |

FOREIGN PATENT DOCUMENTS

| | | | |
|---|---|---|---|
| DE | 3813083 | A1 | 11/1989 |
| DE | 195 11 301 | A1 | 10/1996 |
| DE | 19511301 | A1 | 10/1996 |
| DE | 103 24 810 | A1 | 12/2004 |
| DE | 10324810 | A1 | 12/2004 |
| EP | 1 065 642 | A2 | 1/2001 |
| EP | 1065642 | A2 | 1/2001 |
| EP | 1 491 425 | A2 | 12/2004 |
| EP | 1491425 | A2 | 12/2004 |
| EP | 1 510 441 | A2 | 3/2005 |
| EP | 1510441 | A2 | 3/2005 |
| JP | 10-297506 | | 11/1998 |
| JP | 10297506 | | 11/1998 |
| JP | 2003-205809 | | 7/2003 |
| JP | 2003205809 | A | 7/2003 |
| JP | 2005-145198 | | 6/2005 |
| JP | 2005145198 | A | 6/2005 |
| WO | 2004095198 | A2 | 11/2004 |

OTHER PUBLICATIONS

"PANS: A Portable Navigation Platform" by Todd Jochem et al.; The Robotics Institute, Carnegie Mellon University, Pittsburgh, PA 15213, USA; Apr. 6, 2004; 1-8 pages.

"Practical Position and Yaw Rate Estimation with GPS and Differential Wheelspeeds" by Christopher R. Carlson et al.; Mechanical Engineering, Stanford, CA 94305-4021, USA; 1-8 pages.

* cited by examiner

METHOD OF CALIBRATING AND STEERING A VEHICLE PROVIDED WITH A POSITIONING SYSTEM

CROSS REFERENCE TO RELATED APPLICATIONS

This application is entitled to the benefit of and incorporates by reference essential subject matter disclosed in International Patent Application No. PCT/DK2006/000452 filed on Aug. 17, 2006 and Danish Patent Application No. PA 2005 01166 filed Aug. 18, 2005.

FIELD OF THE INVENTION

The invention relates to calibration and use of a steering system for a vehicle which is provided with auto-steering based on a positioning system.

BACKGROUND OF THE INVENTION

Auto-steering systems for vehicles are commonly used, e.g. in off-highway machinery such as wheel loaders, excavators, dozers, tractors, harvesters and similar heavy duty machines. Such machines often operate with hydraulic, electro-hydraulic, and electric steering systems. For a system which is operated by a driver, the steering system receives input via a control handle such as a steering wheel or a joystick, and for automatic steering of the vehicle, input may further be received from a GPS system or similar system for automatic positioning and tracking. The input is converted by the steering system into an appropriate hydraulic flow to a hydraulic actuator, e.g. a hydraulic cylinder, which moves a steered element, typically wheels of the vehicle. U.S. Pat. No. 6,052,647 and U.S. Pat. No. 6,539,303 both describe systems for controlling a vehicle along a path by use of GPS technique.

Typically, the input delivered by the positioning and tracking system is a desired path which is described as a radius of a curvature. The steering system is calibrated to translate the received radius into an appropriate hydraulic flow to position the steered wheels correctly relative to the desired curvature. Typically, the systems are calibrated to turn the steered wheels a specific angle for a specific input from the positioning system, and to enable reuse of identical calibration data for several vehicles, each vehicle must be completely identical, and the individual components of the steering system, e.g. the hydraulic actuator, the sensor and the positioning system must be identically configured and positioned relative to other parts of the steering system. Changes in the design of a vehicle and adaptation of new components in the steering system therefore typically require a time consuming recalibration.

SUMMARY OF THE INVENTION

It is an object of the present invention to enable easy calibration of steering systems, e.g. to enable convenient retrofitting of auto-steering in existing machines, or custom made machines wherein the steering system of each machine is adapted for individual purposes and therefore requires individual calibration. Accordingly, the invention, in a first aspect, provides a method of calibrating a steering system of a vehicle wherein a first record comprising a position value representing a first position of the steered element and a curvature value determined during movement of the vehicle with the steered element in the first position is established. Subsequently, a second record comprising a position value representing a second position of the steered element and a curvature value determined during movement of the vehicle with the steered element in the second position is established. Subsequently, further records may be obtained, in particular if the relation between the wheel angle and the position value is nonlinear. As an example, a table may contain 5 records which is one at right end point and one at the left end position of the steered element, one in a centre position wherein the mobile machine follows a straight line and one point between the centre position and each of the end positions. The table may contain even more, e.g. 32 records or more.

By use of the abovementioned at least two records it is easy and fast either to reuse the recorded values directly, or to establish a ratio between the position of the steered element and the curvature of the path followed by the vehicle. After manufacturing of the vehicle, or after having changed the steering system of an existing vehicle, the system is easily calibrated by driving the vehicle with various positions of the steered element while the system establishes the at least two records. Subsequently, when auto-steering is desired and the steering system receives a curvature value from the positioning system, the received value is compared with the values of the records to determine a corresponding position of the steered element, or ratio between the position of the steered element and the curvature of the path followed by the vehicle is calculated by interpolation.

Normally, the steered element would be a wheel of the vehicle, and the position sensor would be inserted anywhere in the steering system to provide a value indicating the position of the wheel relative to the vehicle. The positioning system could be a regular GPS system which continuously determines a position of the vehicle and from the determined positions determines a curvature value of the path followed by the vehicle, e.g. expressed as a value of the radius of a curve.

The steering system could be a hydraulic steering system wherein a hydraulic flow moves the actuator between two extreme positions. To move the steered element in one direction, a hydraulic flow may be provided in one direction into one port of the actuator and out of another port of the actuator, and to move the steered element in the opposite direction, the hydraulic flow may be reversed. The hydraulic flow may be controlled by an electronic processing unit, e.g. via a valve with a spool which is moved electrically or electro hydraulically by the processing unit.

The processing unit may communicate with data storage means for storing the mentioned data records and with the positioning system from which it may continuously receive curvature values. The processing unit may further communicate with the sensor to continuously receive position values indicating the position of the steered element. This allows the processing unit to control the position of the steered element in a closed loop fashion wherein the hydraulic flow is continued, and optionally reversed back and forth in the abovementioned two ports until a desired signal is returned from the sensor.

During calibration of the system, the vehicle is driven, e.g. at a relatively low ground speed, e.g. at 5 kph. The steered element is moved to a first position, e.g. an extreme position, e.g. an uttermost left or right position of a steered wheel, and after a few seconds, a curvature value which is received from the positioning system is stored in a first record together with a sensor value received from the position sensor. The steered element is moved away from the first position and after another period of time, e.g. after a few seconds, another curvature value which is received from the positioning system is stored in a second record together with a new sensor value received from the position sensor. Subsequently, the steered element may be moved to other positions and the procedure may be repeated until pluralities of records have been stored in the data storage means. The system may automatically capture the above-mentioned values while a driver drives the vehicles in various curves, or capturing of the record may be activated by the driver via a push-button. In one embodiment, the system is adapted to automatically drive the vehicle in a calibration sequence wherein the steering system automatically moves the steered element between various positions and stores the records. When the calibration is finished, autosteering may be executed by receiving a desired curvature value from the positioning system and by finding a record comprising a similar curvature value amongst the stored records. Hereafter, the steered element is moved until the sensor returns a position value corresponding to the position value of the found record. If no records with a similar curvature value can be found, the processing unit may interpolate between a curvature value which is larger than the desired curvature value and a curvature value which is smaller than the desired curvature value.

Since existing steering systems often operate with a processing unit with a limited processing capacity, it is an advantage to simplify the search algorithm which is implemented to find the stored record having a curvature value closest to the desired curvature value. For this purpose it is an advantage to calibrate the system by storing records with fixed values of the curvature, e.g. to calibrate by always filling out a table comprising a fixed number of records, e.g. 5 records, wherein each radius is of a fixed size, e.g. in which the first record has a radius of e.g. 10, the next a radius of e.g. 20, the next a radius of 30 etc. It is an advantage to start at an extreme position. Since each vehicle may have individual mechanical configuration, the extreme position of the steered element may be different from vehicle to vehicle. It is therefore an advantage to use the extreme position as one of the positions of the steered element and for the other positions to use the same positions for all vehicles which are fitted with the steering system according to the invention.

In one embodiment, curvature values and corresponding sensor values are found for the extreme right and left position. Subsequently, the steered element is moved to a position wherein the curvature is zero, and the curvature value together with the corresponding sensor value is stored. Subsequently, each of the two ranges from zero to the two extreme positions is split into a number of segments and corresponding sensor and curvature values are recorded for each segment.

Advantageously, a ratio between a position value and a curvature value is established. Due to the configuration of the steering system, it will normally be impossible to establish a linear ratio between position values and curvature values for the entire steering range from one extreme position of the steered element to an opposite position of the steered element. The ratio is therefore preferably established between each of the records. If a relatively large number of records have been stored, e.g. 50-70 records for the entire steering range, the established ratio may be considered approximately linear, i.e. the ratio may be described by two parameters in a function of the type $F(x)=a*x+b$ wherein F denotes the position value and x denotes a curvature value. For each two records, one set of the parameters a and b could be stored in the storage means and used for determining a position value from a specific curvature value which is between the curvature values of the two records.

In a second aspect, the invention provides a method of steering a vehicle based on commands from a positioning system, the vehicle comprising an actuator arranged to move a steered element of the vehicle, a sensor for determining a position value representing a position of the steered element, and a positioning system capable of generating a curvature value representing a curvature of a path followed by the vehicle, the method comprising the steps of:

receiving a curvature value from the positioning system,
in a table which comprises curvature values and corresponding position values, finding a position value which corresponds to the curvature value, and
moving the actuator to the position represented by the position value.

In particular, the method may imply determining the curvature value and a corresponding position value by interpolation.

In a third aspect, the invention provides a steering system for a vehicle, the system comprising:

an actuator arranged to move a steered element of the vehicle,
a sensor for determining a position value representative of a position of the steered element,
a positioning system capable of generating a curvature value representing a curvature of a path followed by the vehicle, and
data storage and processing means adapted to generate a record with a position value for a position of the steered element and a curvature value which is subsequently received from the positioning system while the vehicle is moved with the steered element in that position.

Any of the features described relative to the first aspect of the invention may apply also in relation to the second and third aspects.

BRIEF DESCRIPTION OF THE DRAWINGS

In the following, a preferred embodiment of the invention will be described in further details with reference to the drawing in which.

DETAILED DESCRIPTION OF A PREFERRED EMBODIMENT

The following abbreviations have been used in connection with the description:

| Term | Description |
| --- | --- |
| ADC | Analogue to Digital Converter |
| CAN | Controller Area Network |
| curvature | 1/radius; 0 corresponds to straight ahead |
| EHPS | Electro-hydraulic Power Steering |
| GPS | Global Positioning System |
| MMI | Man-Machine Interface |
| PVED-CL | Proportional Valve Digital - Closed Loop - here the EHPS controller |

Figure 1:
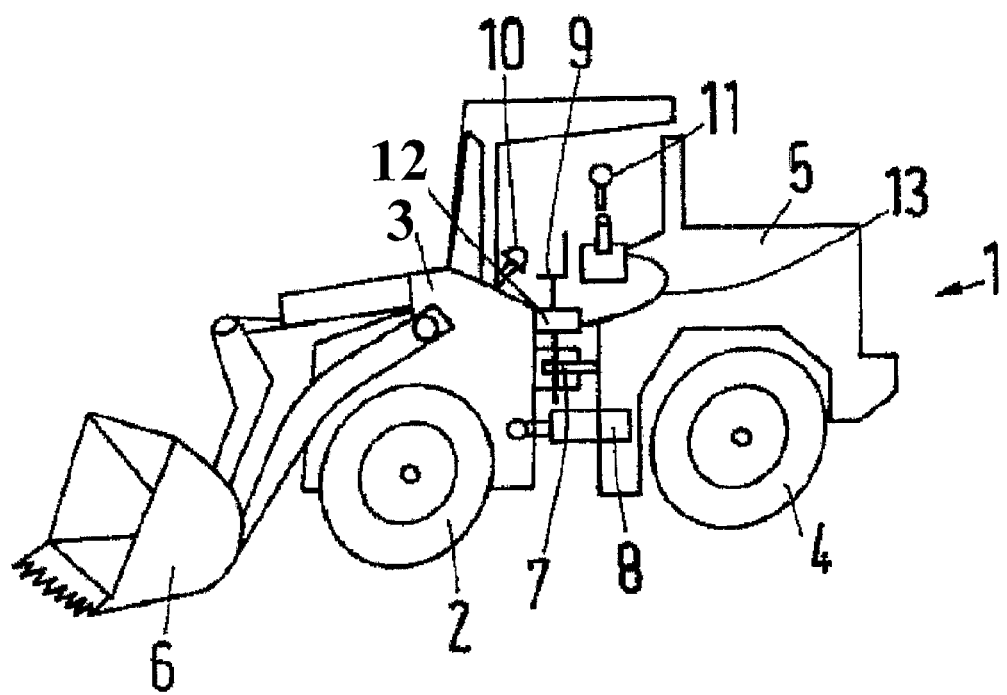
FIGS. 1 and 2 show details of a vehicle.
Figure 2:
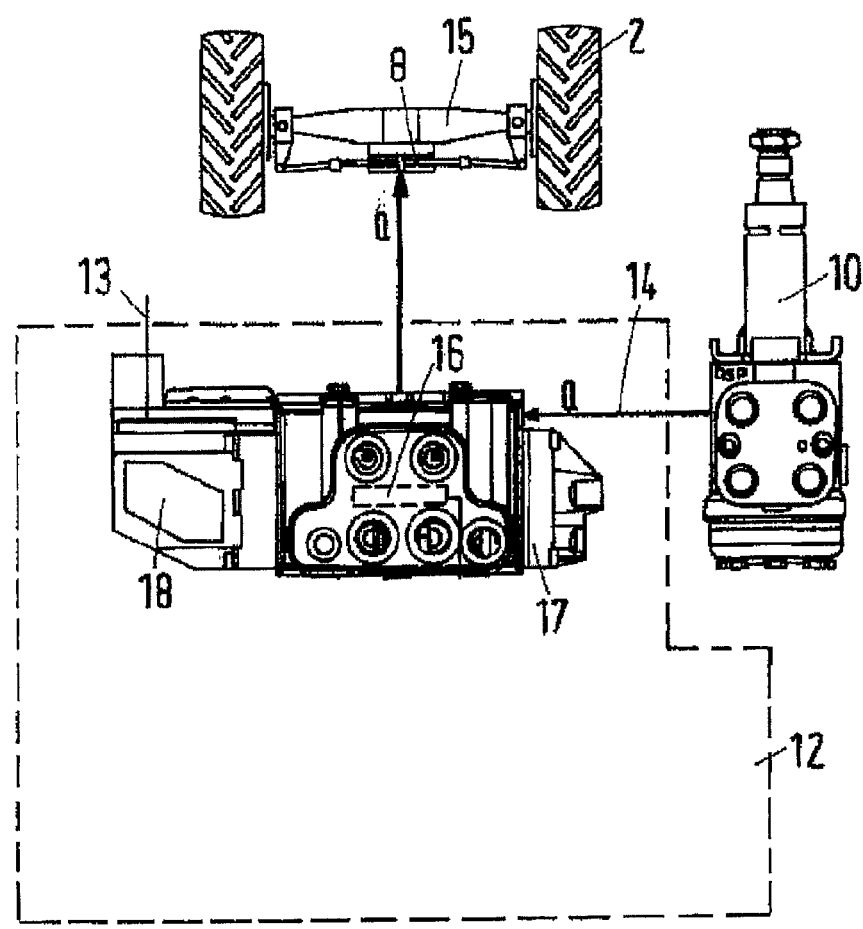

FIGS. 1 and 2 show details of a front-end loader or a shovel loader 1. The front wheels 2 of the loader 1 are arranged on a front part 3 and the rear wheels 4 are arranged on a rear part 5. A shovel 6 is arranged on the front part and the rear part 5 carries a motor. Front and rear parts are connected by a hinge joint 7 which is located approximately in the middle of the front-end loader 1 and which enables rotation of the front part 3 relative to the rear part 5. The rotation is forced by a hydraulic cylinder 8. The cylinder 8 receives hydraulic fluid under pressure causing its piston rod to move in or out. The supply of hydraulic fluid is substantially determined by a valve 16 which is communicating with, or forms part of a control unit 12. In the embodiment shown in FIG. 2, the valve element 16 can be moved via the line 14 which transmits a hydraulic steering signal from the steering wheel to the valve 16 to move a spool inside a housing 17 of the valve. The spool may alternatively be moved electrically via an electric actuator 18 which receives signals from the processing unit via the electrical connection 13. In one embodiment, the actuator and the processing unit is combined into one single component which receives the requested curvature value from the GPS system.

The vehicle is provided with a GPS system which is connected to a processing unit which forms part of or which is connected to the control unit 12 to enable automatic steering of the vehicle. The GPS system requests a curvature value which in response to the request moves the hydraulic cylinder 8 until the vehicle follows the requested curve. For this purpose, the steering system comprises a sensor which determines a position of the steered element and which forward a corresponding position value to the processing unit.

To facilitate calibration of the steering system, the processing unit comprises a table with curvature values and corresponding sensor values, and to increase processing capacity, the table comprises a first group of curvature values which are always identical for all vehicles using the system, and a second group with two curvature values corresponding to the two extreme positions of the steered element for each specific vehicle. Due to tolerances and differences from vehicle to vehicle, the curvature values of the second group are typically unique.

When the vehicle is build, or after certain refit or overhaul of the vehicle, sensor values are received from the sensor while the vehicle is driven while curvature values are received from the GPS and stored in the table together with corresponding position values which is received from the sensor. When the table is build, auto-steering may be facilitated wherein the processing unit receives requested curvature values. If a requested curvature value is outside the curvature values corresponding to the extreme positions of the steering for the vehicle in question, the steered element is simply moved to the extreme-position until a curvature value is requested which is within the range.

Assumptions
1. The GPS controller needs to have a special mode implemented in which the current curvature is reported to other parts of the system. This can only happen if the parts are mounted on a moving vehicle, since a stationary object has no heading, trajectory, or driving radius.
2. The system has to provide an operator with some means to start, stop and resume the auto-calibration process. This may be an MMI controller communicating over the CAN bus with other parts of the system.

Activities

The following is a list of activities which need to be performed in order to complete the auto-calibration process:
1. The minimum (max left) and maximum (max right) curvature values have to be found as they are vehicle dependent. These values allow the controller to calculate the distance/step which will be used in the curvature-to-sensor value look-up table.
    This can be achieved by turning the wheels max to the left/right (based on values configured during the "primitive", manual calibration) and looking at the current curvature reported by the GPS controller when the vehicle moves.
2. As the crucial point is to get high accuracy while following a straight line, it is important to calibrate the wheel angle neutral position, what means finding the raw value reported by the feedback sensor when the vehicle goes straight ahead. Once the value is found, the low-level driver has to be reconfigured in order to perform scaling in a proper way.
    PVED-CL needs to move the wheels to the neutral position (according to the pre-configured values) and check the current curvature report sent from the GPS controller. The difference between the reported and neutral curvature values says what kind of correction, to the left or to the right, is needed. Then, the controller moves the wheels accordingly until the neutral curvature value is reported. The raw feedback sensor value for which the GPS controller reports neutral curvature has to replace the value set up during the manual calibration process.
3. To make the controller correctly interpret the curvature commands and send out valid estimated curvature reports, the sensor values have to be found for some curvatures between the neutral and min/max ones. These values need to be stored into the look-up tables. Curvature-to-sensor value table will be used for steering, whereas sensor value-to-curvature one will be used for creating reports. Two separate tables (regularly placed points in the curvature and sensor value domain, respectively) will result in faster operation because of no need for complex search algorithms.
    PVED-CL will move the wheels to the neutral position. Once it is done, the controller will start moving the wheels slowly to the side and looking at both sensor values and current curvature reports. The sensor values corresponding to the curvature values for which the difference from neutral can be expressed as an integral number of steps calculated in point 1 will be stored in the curvature-to-sensor value look-up table. The similar rule applies to the curvatures corresponding to the pre-selected (design decision) sensor values.
4. The look-up table data has to be stored in the non-volatile memory what allows the controller to use the data until the calibration process is performed again, what shall have place upon e.g. the feedback sensor replacement or changes to the mechanical steering geometry of the vehicle (e.g. due to adjustment).

Preconditions
1. The manual calibration process has to be performed in order to specify the direction, left/right. This results in the raw feedback sensor values for the max left, neutral and max right wheel position stored in the PVED-CL's configuration memory.
2. Proper devices, what includes the GPS controller with 'current curvature tracking', feedback sensor, MMI controller and at least one steering device need to be mapped into the PVED-CL's configuration and enabled.
3. PVED-CL has to be configured with the correct network addresses (J1939/ISOBUS) for the devices which are mapped on the CAN bus.

Assumptions and Design Decisions
1. The feedback sensor signal is internally represented as a value within the range 1000 . . . −1000, where −1000 corresponds to the max left, 0 corresponds to neutral and 1000 to the max right position. Proper scaling is done by a low-level ADC driver configured with the data stored in the non-volatile memory (e.g. raw sensor readings for max left, neutral and max right position).
2. The look-up tables contain regularly placed points (32 for each direction in the table) in the curvature and sensor value domain, respectively. Regular placement results in no need for storing the input values.
3. Wheel angle is limited to 45-50 deg. in each direction (90-100 deg. in total). If wider angles are needed, more points may have to be stored in the tables—this possible change should be supported by proper implementation.
4. Auto-calibration process is initiated, stopped and resumed upon a proper event notification, e.g. CAN command, steering wheel motion and/or active signals from other steering device, respectively.

FIGS. 3-9 show flow charts for a system in which the following definitions apply:

| Term | Description |
| --- | --- |
| r_sv | requested feedback sensor value |
| c_sv | current feedback sensor value |
| temp_sv | stored feedback sensor value (auxiliary variable) |
| r_rsv | requested raw feedback sensor value |
| c_rsv | current raw feedback sensor value |
| temp_rsv | stored raw feedback sensor value (auxiliary variable) |
| r_c | requested curvature |
| c_c | current curvature |
| temp_c | stored curvature (auxiliary variable) |
| step_c_left | difference between curvature values for which sensor values are stored in the curvature to sensor value look-up table (steering to the left) |
| step_c_right | difference between curvature values for which sensor values are stored in the curvature to sensor value look-up table (steering to the right) |
| step_cnt | step counter (auxiliary variable) |
| step_sv | difference between sensor values for which the curvature values are stored in the sensor value to curvature look-up table (design decision) |
| step_max | number of steps (design decision) |

Figure 3:
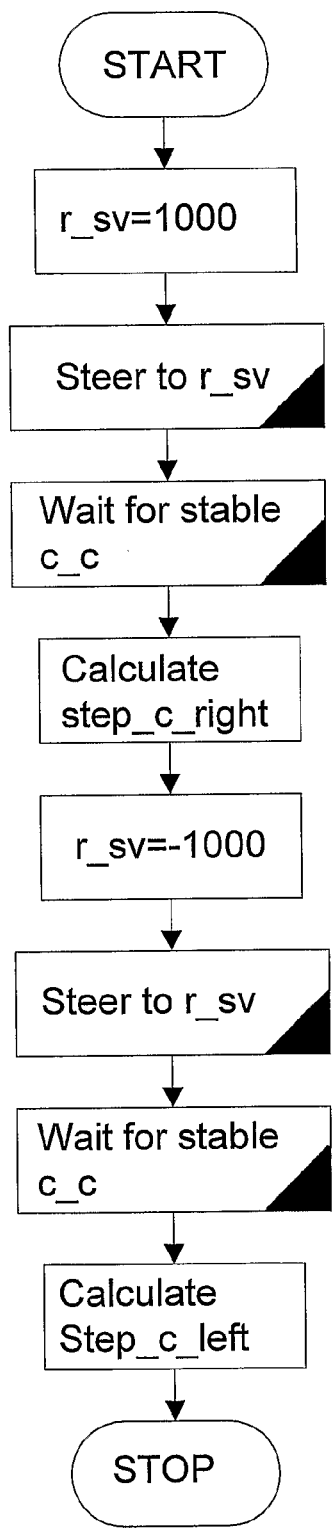
FIGS. 3-9 show functional diagrams of the calibration.

FIG. 3 shows a flow chart for the process of finding minimum and maximum curvature values for a vehicle.

Figure 4:
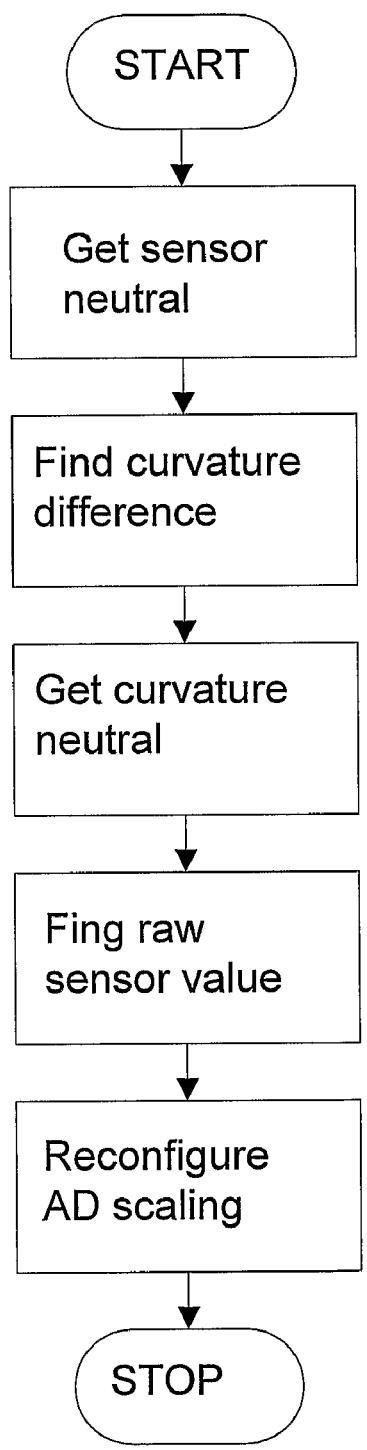
Figure 5:
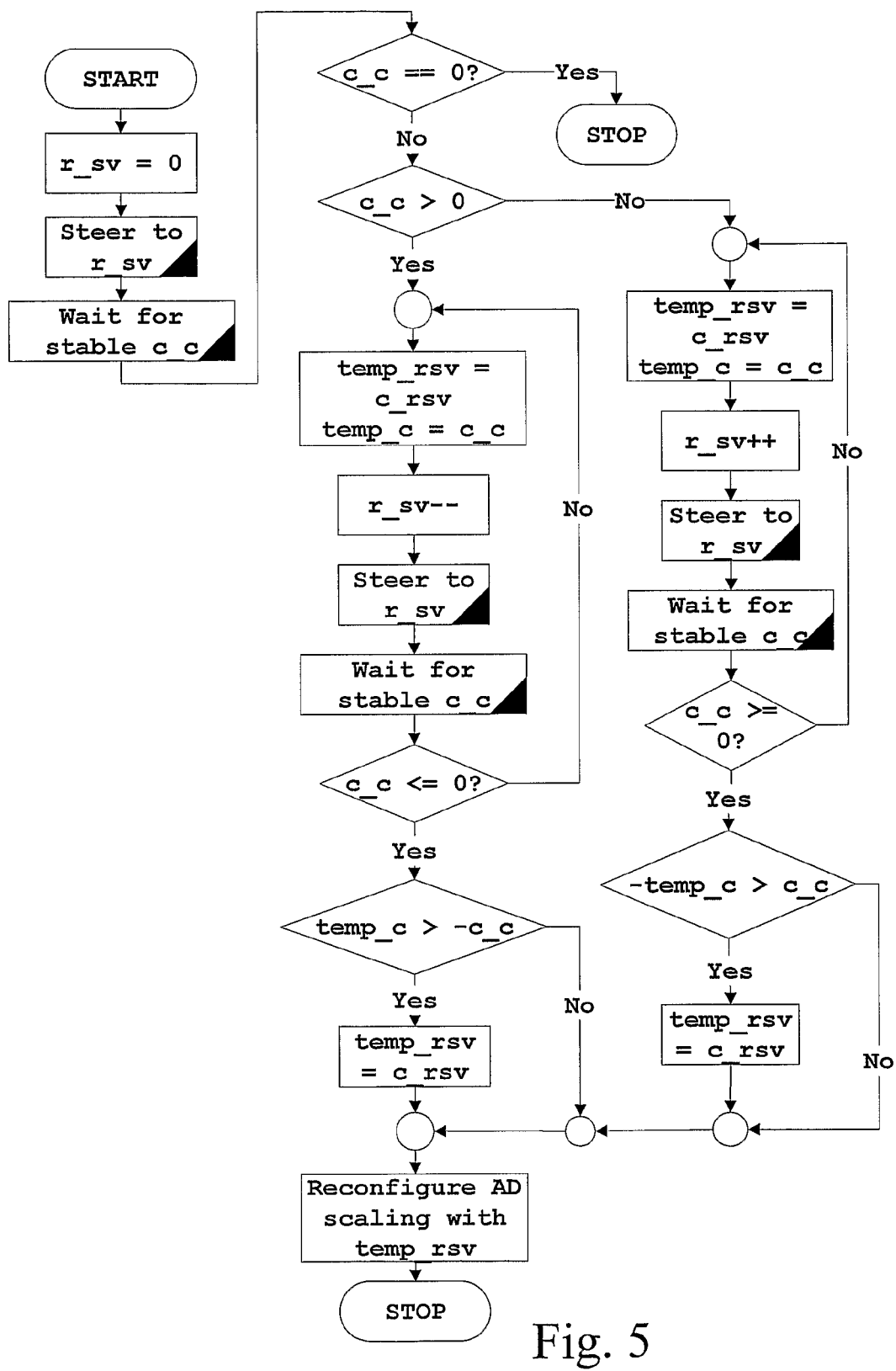

FIGS. 4 and 5 show an overview and a detailed view of the process of calibrating neutral of the vehicle.

Figure 6:
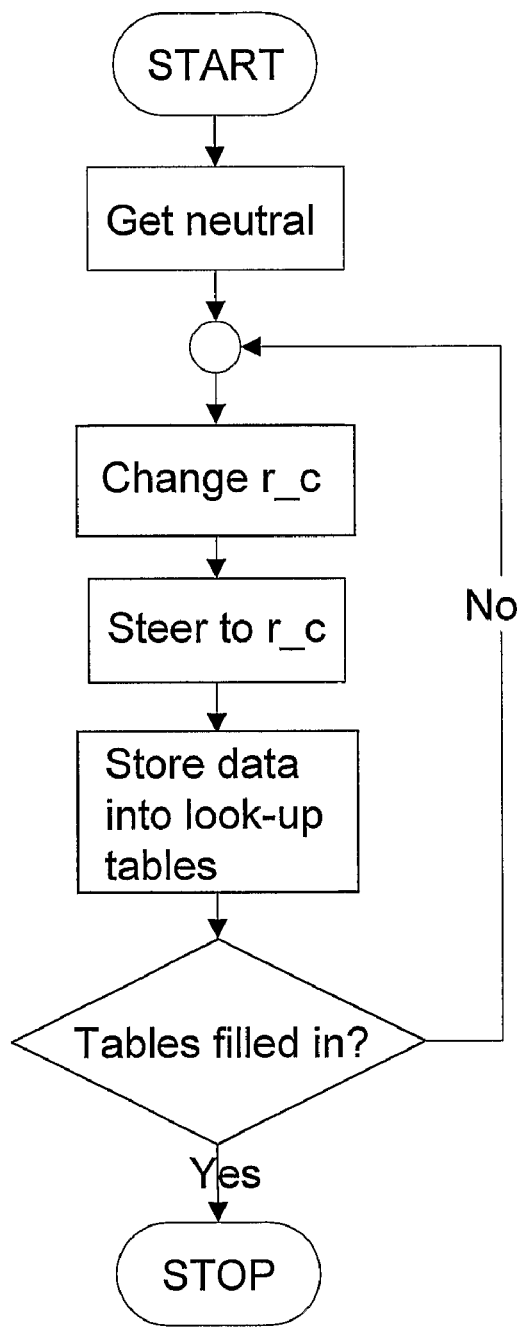
Figure 7:
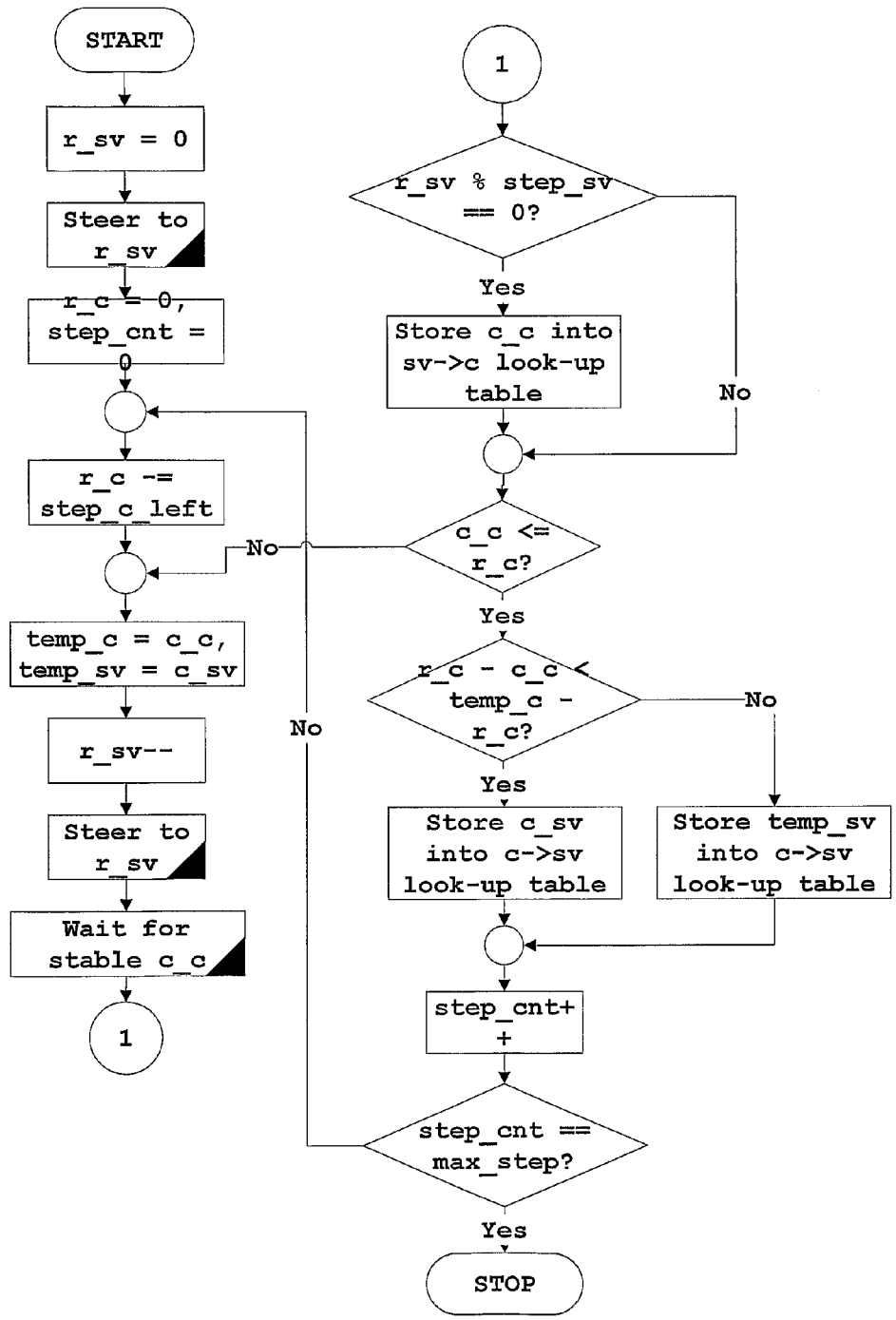
Figure 8:
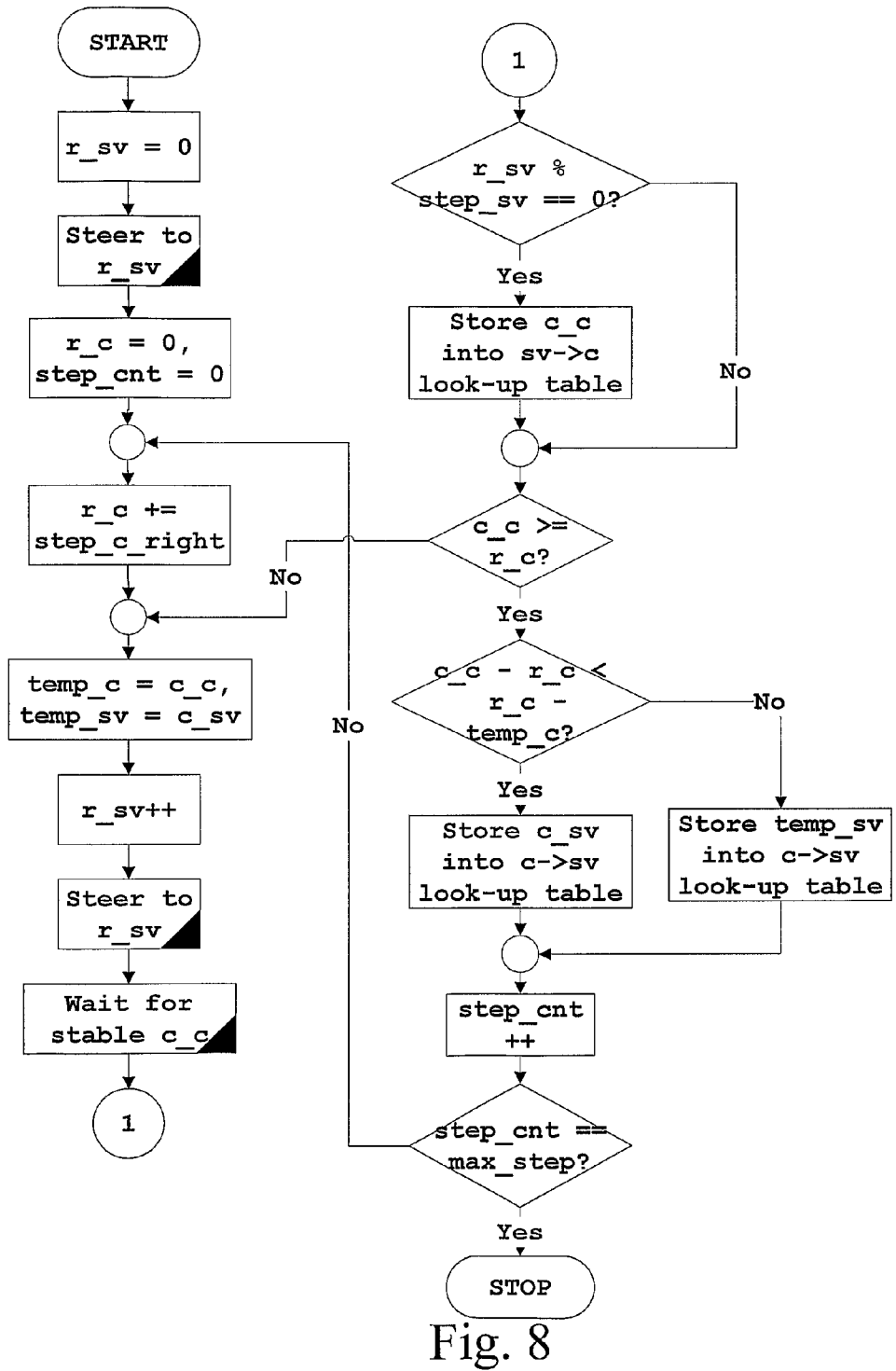
Figure 9:
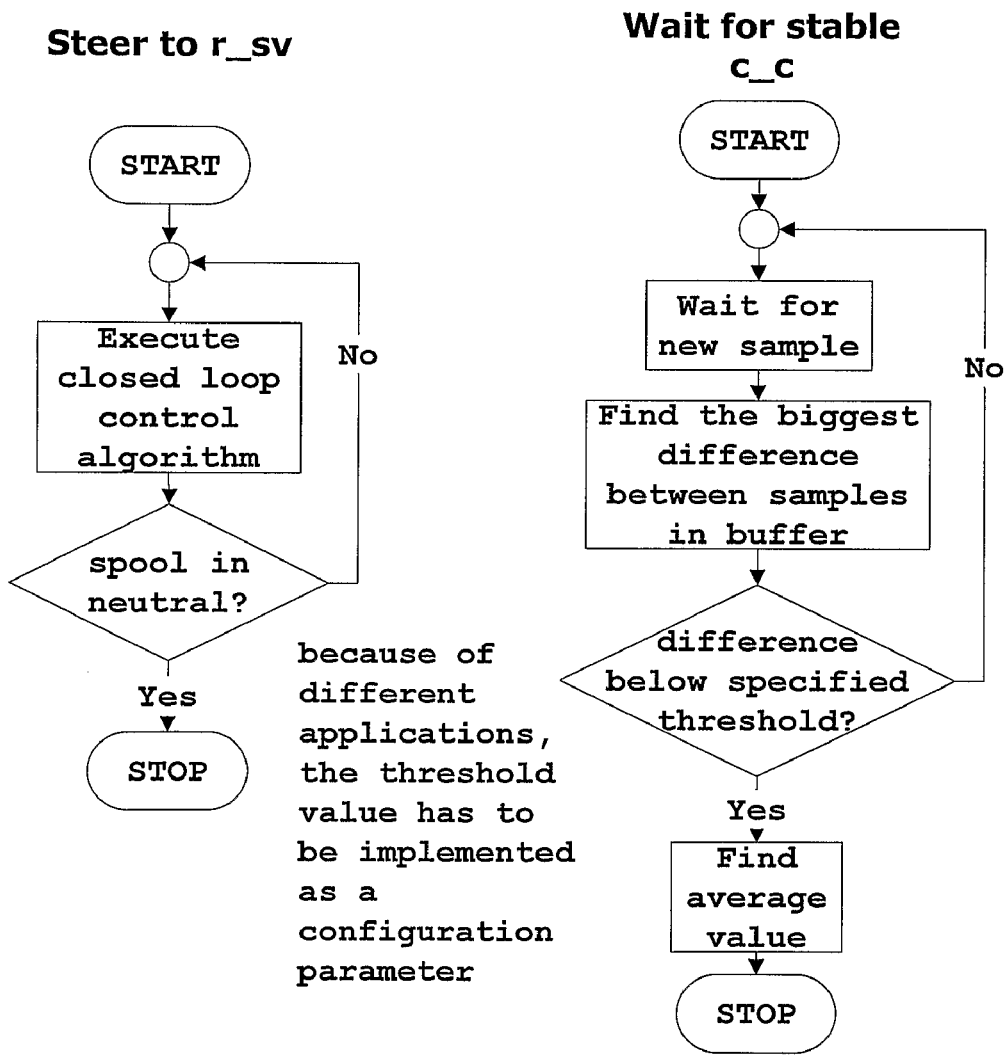
Figure 10:
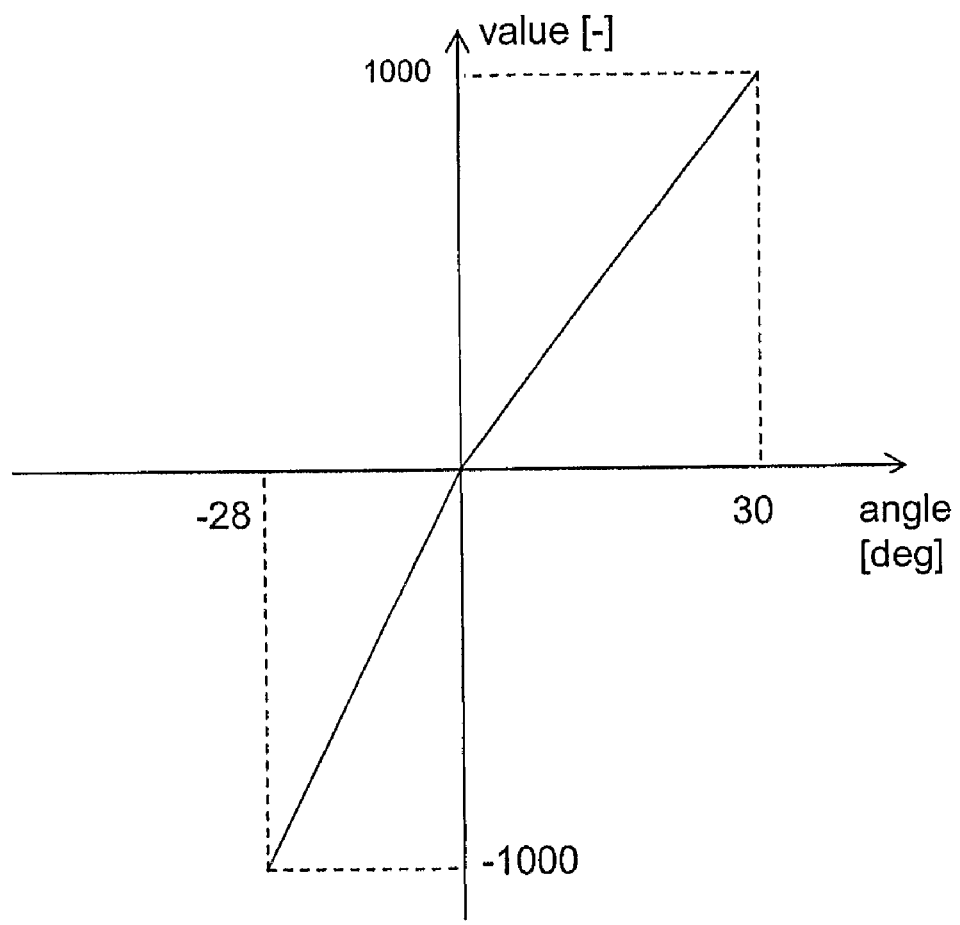
FIG. 10 shows a graph indicating the ratio between the values from the wheel sensor and angles of the wheel of a vehicle.

FIG. 6 shows calibration of left and right side in an overview, and FIG. 7 shows calibration of left side in details whereas FIG. 8 shows calibration of right side in details.

Example

The example presented below shows how the look-up tables are built. Please note the following assumptions/decisions have been made:
1. The look-up tables contain 4 points in each direction.
2. Curvature format follows ISOBUS standard definition—32128 corresponds to straight ahead, unit: 1/(4 km), offset—8032 km$^{-1}$
3. Vehicle length (axle distance): 4 m
4. The feedback sensor characteristics (scaled to −1000 . . . 1000), c.f. also FIG. 11 which shows the ratio between the sensor value and the angle.

Initial Look-Up Tables.

| curvature-to-sensor value | | | sensor value-to-curvature | | |
| --- | --- | --- | --- | --- | --- |
| curvature | sensor value | angle (reference only!) | sensor value | curvature | angle (reference only!) |
| | −1000 | | −1000 | | |
| 32128 | 0 | 0.00 deg | 0 | 32128 | 0.00 deg |
| | 1000 | | 1000 | | |

The min and max curvature values have been found. The curvature difference/step values for the curvature-to-sensor value table can be calculated: (32128−31596)/4=133 and (32705−32128)/4=144, respectively.

| curvature-to-sensor value | | | sensor value-to-curvature | | |
| --- | --- | --- | --- | --- | --- |
| curvature | sensor value | angle (reference only!) | sensor value | curvature | angle (reference only!) |
| 31596 | −1000 | −28.00 deg | −1000 | 31596 | −28.00 deg |
| 32128 | 0 | 0.00 deg | 0 | 32128 | 0.00 deg |
| 32705 | 1000 | 30.00 deg | 1000 | 32705 | 30.00 deg |

The First Point for the Left Side . . .

| curvature-to-sensor value | | | sensor value-to-curvature | | |
| --- | --- | --- | --- | --- | --- |
| curvature | sensor value | angle (reference only!) | sensor value | curvature | angle (reference only!) |
| 31596 | −1000 | −28.00 deg | −1000 | 31596 | −28.00 deg |
| | | | −250 | 32005 | −7.00 deg |
| 32128 | 0 | 0.00 deg | 0 | 32128 | 0.00 deg |
| 32705 | 1000 | 30.00 deg | 1000 | 32705 | 30.00 deg |

The First Point for the Left Side—Curvature-to-Sensor Value Look-Up Table . . .

| curvature-to-sensor value | | | sensor value-to-curvature | | |
| --- | --- | --- | --- | --- | --- |
| curvature | sensor value | angle (reference only!) | sensor value | curvature | angle (reference only!) |
| 31596 | −1000 | −28.00 deg | −1000 | 31596 | −28.00 deg |
| 31995 | −271 | −7.58 deg | −250 | 32005 | −7.00 deg |
| 32128 | 0 | 0.00 deg | 0 | 32128 | 0.00 deg |
| 32705 | 1000 | 30.00 deg | 1000 | 32705 | 30.00 deg |

The procedure is continued until the entire table has been filled out, c.f. the following table in which shaded cells contain information which needs to be stored in the non-volatile memory.

| curvature-to-sensor value | | | sensor value-to-curvature | | |
|---|---|---|---|---|---|
| curvature | sensor value | angle (reference only!) | sensor value | curvature | angle (reference only!) |
| 31596 | −1000 | −28.00 deg | −1000 | 31596 | −28.00 deg |
| 31729 | −777 | −21.75 deg | −750 | 31744 | −21.00 deg |
| 31862 | −533 | −14.90 deg | −500 | 31879 | −14.00 deg |
| 31995 | −271 | −7.58 deg | −250 | 32005 | −7.00 deg |
| 32128 | 0 | 0.00 deg | 0 | 32128 | 0.00 deg |
| 32272 | 273 | 8.19 deg | 250 | 32260 | 7.50 deg |
| 32416 | 536 | 16.07 deg | 500 | 32396 | 15.00 deg |
| 32560 | 779 | 23.36 deg | 750 | 32542 | 22.50 deg |
| 32705 | 1000 | 30.00 deg | 1000 | 32705 | 30.00 deg |

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method of calibrating a steering system for a vehicle, the system comprising an actuator arranged to move a steered element, a sensor for determining a position value representing a position of the steered element, and a positioning system for determining a curvature-value representing a curvature of a path followed by the vehicle, the method comprising the steps of:
    establishing a first record comprising a position value representing a first position of the steered element and a curvature value determined during movement of the vehicle with the steered element in the first position,
    establishing a second record comprising a position value representing a second position of the steered element and a curvature value determined during movement of the vehicle with the steered element in the second position.

2. The method according to claim 1, wherein a ratio between a position value and a curvature value is established.

3. The method according to claim 2, wherein the ratio is established by interpolation between the values of the first and second records.

4. The method according to claim 3, wherein the interpolating is linear.

5. The method according to claim 1, wherein the steered element is movable between two extreme positions via an intermediate position, and wherein the steered element is stopped at a plurality of different positions between one of the extreme positions and the intermediate position while records comprising position values and curvature values are recorded.

6. The method according to claim 5, continued for positions between the opposite extreme position and the intermediate position.

7. A steering system for a vehicle, the system comprising:
    an actuator arranged to move a steered element of the vehicle,
    a sensor for determining a position value representative of a position of the steered element,
    a positioning system capable of generating a curvature value representing a curvature of a path followed by the vehicle, and
    data storage and processing means adapted to generate a record with a position value for a position of the steered element and a curvature value which is subsequently received from the positioning system while the vehicle is moved with the steered element in that position.

8. The system according to claim 7, further comprising data selection means adapted to search for a record with a specific curvature value and to move the steered element until the sensor returns a position value included in the same record.

9. The system according to claim 7, further comprising data processing means adapted to determine a ratio between curvature values and messages of data records.

10. The system according to claim 7, wherein the actuator moves the steered element based on a fluid flow.

* * * * *